May 18, 1926.
J. P. SEAHOLM
BEET PULLER
Filed May 5, 1919
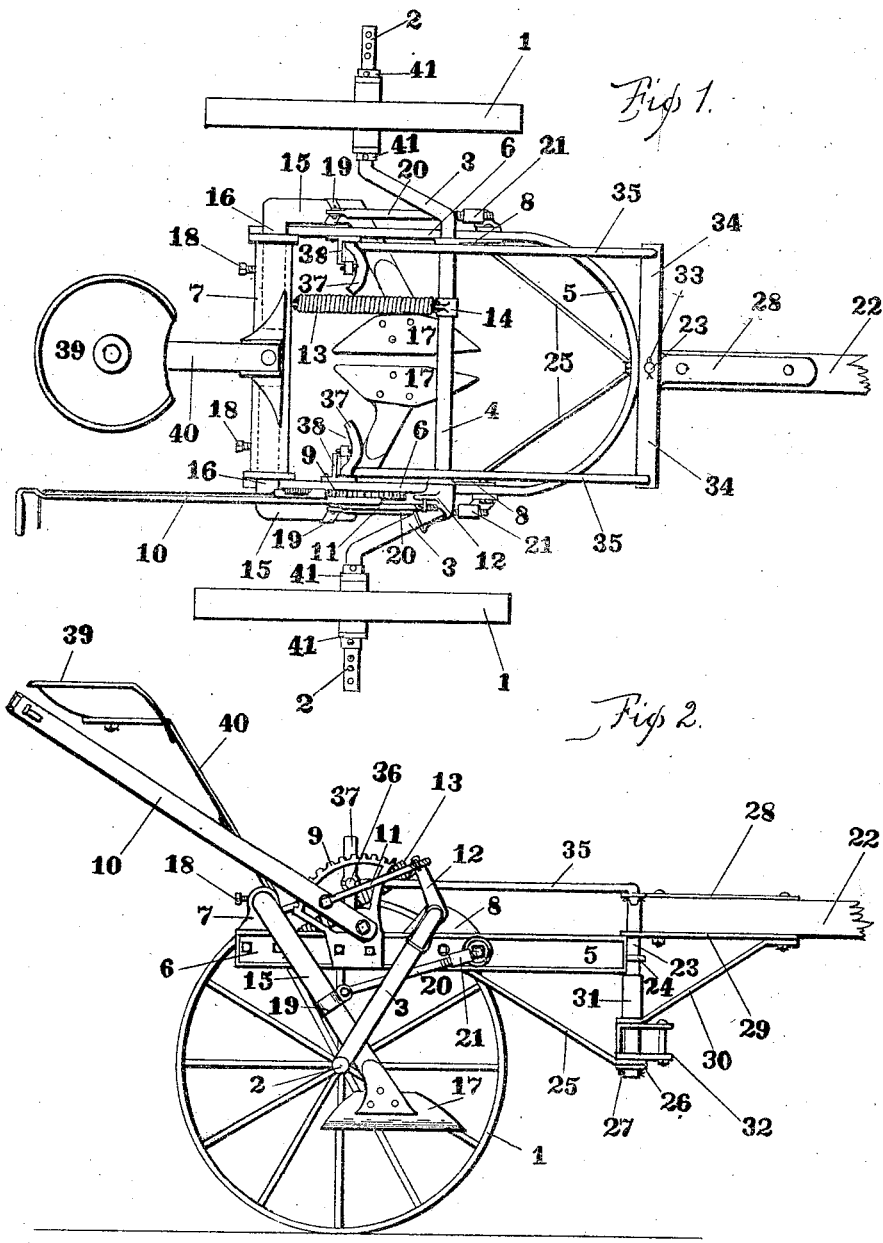

Patented May 18, 1926.

1,584,996

UNITED STATES PATENT OFFICE.

JOHN P. SEAHOLM, OF MOLINE, ILLINOIS, ASSIGNOR TO DEERE & COMPANY, OF MOLINE, ILLINOIS, A CORPORATION OF ILLINOIS.

BEET PULLER.

Application filed May 5, 1919. Serial No. 294,712.

This invention relates to improvements in machines commonly known as beet pullers which are provided with devices that travel in and loosen the earth at both sides of a row of beets and by their action force the beets out of and upon the surface of the ground ready to be gathered up by hand.

The leading objects of my invention are to provide improved means for connecting the blade-carrying beams to the frame so as to permit them to be adjusted laterally for properly positioning the blades with respect to the row of beets to be operated on, such adjustment being necessary on account of the variation in the size of the beets; to provide improved means for varying the inclination of such beams so that the lifting effect of the blades carried thereby may be regulated as required; to provide means whereby in addition to the guiding of the implement by the action of the draft animals as usual an independent guiding by means under the direct control of the operator may be had so as to compel the blades to follow irregularities in plant rows, and thereby avoid cutting or otherwise injuring the beets; and to improve generally the construction and operation of machines of this general character. I attain these objects by the devices and combinations of devices illustrated in the accompanying drawings and hereinafter particularly described. Those things which I believe to be new will be set forth in the claims.

In the drawing:

Fig. 1 is a top or plan view of a machine in which is embodied my improvements; and Fig. 2 is a side elevation of the same with the earth engaging elements in raised or inoperative position.

Referring to the drawings, 1—1 indicate the supporting wheels of the machine that are adjustably mounted rotatably upon the spindle portions 2—2 of a crank axle, the main or body portion of which is indicated by 4, and the two crank portions by 3—3. Mounted upon and supported by this axle is a main frame which, as shown, comprises a curved forward portion 5 that merges into a pair of rearwardly-extending parallel side members 6—6, the rear ends of such side members being connected together by a cross-bar 7, through which extends from end to end a cylindrical opening adapted to receive and hold in different adjusted positions the turned ends of shovel beams, as more particularly described hereinafter. The supporting frame described is connected with the crank axle by means of two brackets 8—8 bolted respectively to the members 6 of the frame, and through openings in which the body portion 4 of the axle passes. The axle is intended to be rocked in the brackets for the purpose of effecting the raising and lowering of the frame and the parts carried thereby, and to this end I provide a lever mechanism and means for locking it in various adjusted positions. The lever referred to is indicated by 10, and is pivoted alongside of an ordinary toothed segment 9 with which a spring latch carried by the lever will engage, as usual. Pivotally secured to the lever 10 near the lower end thereof is a link 11 which, at its forward end, is suitably connected to the upper end of an arm 12 that is fixedly secured upon the main portion 4 of the crank axle. By a stroke of the lever it is evident that the crank axle can be rocked, and thereby cause the desired raising or lowering of the frame. At 13 is represented a coiled spring which at its forward end is connected with an arm 14 suitably secured upon the main portion of the crank axle, and at its rear end is connected in any desired way with the hollow cross-bar 7. Such spring acts as a balancing means to aid the operator in making the several adjustments of the frame as described. 15—15 indicate two beams, each of which carries at its lower end a blade adapted to run in the earth alongside of a row of beets, and by the joint actions of the two blades cause a raising or forcing up of the various beets in the row, as usual. These beams 15 at their upper portions lie alongside of the outer faces of the frame members 6, and are inclined not only in a forward and downward direction, but, as best shown in Fig. 1, are also inclined inwardly to bring their respective blades adjacent to and at opposite sides of the median line of the implement so that they may work at opposite sides of a row of plants. The blades referred to are each indicated by 17 and, as shown in Fig. 1, they engage the ground close to the transverse vertical plane of the wheel axes. Inasmuch as beets vary considerably as to size, due to differences in varieties as well as soil and climatic conditions, it is necessary to make provision for adjusting the blades closer to or farther from each other so that they will be spaced apart just the required extent to properly perform their function—that is, to travel close enough to the line of beets to insure the proper forcing up and out of the ground of such beets, but without contacting and cutting or bruising them. I provide for such adjustments by constructing each beam 15 at its upper end with an inwardly-turned horizontal portion 16 of a size and shape to fit the cylindrical opening in the rear cross-bar 7 of the main frame. As shown in Fig. 1, these turned horizontal portions 16 are inserted in opposite ends of the hollow cross-bar 7, and when inserted to the desired extent they will be locked in place by set bolts 18—18.

In addition to the lateral adjustment of the beams in the manner and for the purpose just described, it is important to make provision for varying the inclination of the blades to better adapt them for their work, such variation depending upon the particular condition of the soil in which the machine is being used, or the particular variety or character of the beets that are to be acted upon. For securing the desired inclination of the blades, each beam 15 has connected to it a rod 20 which, in the construction shown, is pivotally attached at its rear end to a clip 19 secured around the beam, the forward end of the bar being adjustably connected to the adjacent frame member 6. As shown, this connection of the forward end of the bar to its frame member is an adjustable one, and is made by screwing the threaded forward end of the rod into a screw-threaded socket 21 that is secured upon the outer face of the adjacent frame bar 6. By loosening the set bolts 18—18 it is evident that the beams 15 can be adjusted laterally, as desired, and by adjusting the rods 20 in their respective sockets 21, the beams 15 can be rocked on their horizontal members 16 to obtain the required degree of inclination of the beams to give the desired angle to the blades carried by the beams, and after either or both of these adjustments have been made, the beams will be locked in position by again tightening the set bolts 18. By providing that the side or crank members 3 of the axle shall extend from the frame diagonally toward the rear of the machine and that the blade-carrying beams are connected to the frame near the rear end thereof and extend diagonally forward a construction is secured that possesses very decided advantages. It ensures a well-balanced and compact machine and it brings the blades that are carried by the beams near the transverse vertical planes of the wheel axes which position will cause them to be carried and operated at a substantially uniform depth relative to the ground surface, which result is difficult of attainment where the soil-engaging devices are so disposed as to be located considerably forward of said wheel axes, unless additional supporting wheels are provided for the forward end of the frame. I am, therefore, able to employ but a single pair of supporting wheels, which of course is a construction that lends itself, as is well recognized, to ease in turning of the machine. In a machine of this character it is highly important that the blades be located relatively close to said vertical transverse plane of the wheel axes for if located considerably in advance thereof the driver would not be able to bodily force them laterally through the soil nor could he exert sufficient force, through the use of the devices hereinafter described, to swing the front end of the frame laterally for guiding the blades to one side, but with the construction here shown and described the frame, during a turning or swerving operation when the blades are in the ground, will pivot about a point between the two blades and hence render such movement a simple and easy one to accomplish.

22 indicates a draft tongue by which the frame of the machine will be supported in substantially level position when the machine is being operated, and will, of course, serve as the means for guiding the machine with the draft animals—the front end of the tongue being supported in the usual neck yoke attached to the draft animals. The tongue 22 is pivotally connected to the front portion 5 of the main frame for lateral swinging by means of a comparatively long vertically-disposed pin 23 clamped to the outer face of said member 5 by a clip bolt 24, and from the lower end of the pin two braces 25 extend to and are secured to the side members of the main frame, thus holding the pin vertical. A washer 26 and a cotter 27 prevent the brace members from becoming disconnected from the pin. 28—29 indicate plates bolted to the upper and lower faces, respectively, of the tongue, and forming the means by which the tongue is connected with the pivot pin 23, as shown in Fig. 2. 30 indicates an inclined brace extending between the tongue and the lower portion of the pin 23, a spreader block 31 being mounted on such pin between the under face of the frame member 5 and the end of the brace 30, thus holding the brace in proper position. Between the lower end of the brace and the washer 26 is secured an ordinary clevis 32 to which the draft devices are to be attached. 33 indicates a cotter through the upper end of the pin 23 for holding the tongue 22 in place on the pin. It is often desirable that the machine be swerved to one side or the other sufficiently to allow the blades to conform to irregularities in a row, and in order that such swerving may be accomplished independently of the turning that would be given by the action of the team and be given more quickly and to just the exact extent required, I have provided means under the control of the driver for performing such movements.

34 indicates a cross-bar extending across the base of the tongue, and, in the construction shown, being formed integral with the plate 28 that is bolted to the upper face of the tongue, and, as shown in Fig. 1, the pin 23 projects through the central portion of this cross-bar member. In each end of the member 34 is an opening into which projects the turned end of one of two steering links 35—35, the rear end of each link being pivotally connected at 36 (see Fig. 2) with a foot lever 37 which is supported at its lower end in a bracket 38 attached to the inner face of the adjacent side bar 6 of the main frame. 39 indicates the driver's seat mounted as usual on the rear end of a spring bar 40 bolted to a bracket on the rear cross-bar 7 of the main frame.

With the beams 15 adjusted in the manner described so as to properly position the blades for their work, and with the blades in position in the earth at the sides of a row of plants, the operator during the forward progress of the machine will keep his feet on the foot levers 37—37, and by pressing equally thereon can hold the tongue substantially straight and rigid. If, however, it be desired to swerve the machine laterally to follow a sharp curve or irregularity in the row, he will apply pressure upon one lever 37 only. That pressure will swing the cross-piece 34 on the pivot pin 23, and by reason of the neck yoke, in which the forward end of the tongue is engaged, acting as a fulcrum, the result will be that the pressure will be transferred laterally to the pivot pin 23 and thus cause a swinging or turning of the rear end of the tongue and the front of the frame to one side sufficiently to divert the machine from a straight course as desired. When the occasion for departing from a straight line of travel has passed, and it is desired to resume such straight line again, pressure on the other foot lever with a corresponding release of pressure on the foot lever that had been forced forward to cause the divergence from the straight line will bring the machine back into its normal course.

Attention has been called to the fact that the supporting wheels are capable of being adjusted on their respective spindles, and as will be seen by reference to Fig. 1, I provide each of the spindles 2 with a plurality of holes so that the wheels may be fixed in any desired position by locking the two collars 41, with which each wheel spindle is provided, at any desired point on the spindle. This adjustment is of value in a machine of this character in view of the fact that the practice varies in different communitites with respect to the width maintained between rows of beets. By the adjustment of the wheels in this manner the machine can be readily adapted for use regardless of the variations in the width between rows.

What I claim as my invention and desire to secure by Letters Patent, is—

1. In a beet-puller, the combination with a frame, of downwardly-extending blade-carrying beams and means for mounting said beams on the frame, said beams being movable in said mounting means to effect both a transverse and a rocking longitudinal movement of the beams.

2. In a beet-puller, the combination with a frame, of downwardly-extending blade-carrying beams and means for mounting said beams on the frame, said beams being independently movable in said mounting means to effect both a transverse and a rocking longitudinal movement of the beams.

3. In a beet-puller, the combination with a wheel-supported frame, of downwardly-extending blade-carrying beams each having a horizontal upper end portion rotatably mounted on the frame to permit the beam to be rocked forward and back, and means for holding the beams in the different positions to which they may be rocked.

4. In a beet-puller, the combination with a wheel-supported frame, of downwardly-extending blade-carrying beams each having a horizontal upper end portion that is adjustable transversely of the frame and rotatably mounted on the frame to permit the beam to be rocked forward and back, and means for holding the beams in the various positions to which they may be adjusted.

5. In a beet-puller, the combination with a wheel-supported frame comprising a hollow transverse member, of downwardly-extending blade-carrying beams each having a turned portion at its upper end inserted in said hollow member and adjustable therein to position their respective blades closer to or farther from each other.

6. In a beet-puller, the combination with a wheel-supported frame, comprising a hollow transverse member, of downwardly-extending blade-carrying beams each having a turned portion at its upper end journaled in said hollow member to allow the beams to be rocked to different inclined positions.

7. In a beet-puller, the combination with a wheel-supported frame, comprising a hollow transverse member, of downwardly-extending blade-carrying beams each having a turned portion at its upper end journaled in said hollow member to allow the beams to be rocked to different inclined positions, said turned portions of the beams being also adjustable in said hollow member to position their respective blades closer to or farther from each other.

8. In a beet-puller, the combination with a wheel-supported frame, comprising a hollow transverse member, of downwardly-extending blade-carrying beams each having a turned portion at its upper end journaled in said hollow member to allow the beams to be rocked to different inclined positions, said turned portions of the beams being also adjustable in said hollow member to position their respective blades closer to or farther from each other, and means for locking said beams in their different adjusted positions.

9. In a machine of the class described, the combination of a rigid frame, a pair of supporting wheels therefor, a crank-axle upon spindle portions of which said wheels are mounted, said crank-axle connected with said frame and extending toward the rear of the frame, blade-carrying beams mounted on the frame in rear of the axes of the wheels and extending diagonally forward to position the blades carried by the beams adjacent to the transverse vertical plane of the wheel axes, and a bracing member connected with each beam and extending to and connected with the adjacent side of said frame.

10. In a machine of the class described, the combination of a rigid frame, a pair of supporting wheels therefor, a crank-axle upon spindle portions of which said wheels are mounted, said crank-axle connected with said frame and extending toward the rear of the frame, blade-carrying beams mounted on the frame in rear of the axes of the wheels and extending diagonally forward to position the blades carried by the beams adjacent to the transverse vertical plane of the wheel axes, said beams being adjustable longitudinally of the frame, and a bracing member pivotally connected with each beam and extending to and pivotally connected with the adjacent side of said frame, the effective length of said brace members being adapted to be varied to hold the beams in their different adjusted positions.

11. In a machine of the class described, the combination of a rigid frame, a pair of supporting wheels therefor, a crank-axle upon spindle portions of which said wheels are mounted, said crank-axle connected with said frame and extending toward the rear of the frame, and blade-carrying beams mounted on the frame in rear of the axes of the wheels and extending diagonally forward to position the blades carried by the beams adjacent to the transverse vertical plane of the wheel axes, said beams being separately adjustable longitudinally of the frame.

12. In a machine of the class described the combination of a rigid frame, a pair of supporting wheels therefor, blade-carrying beams mounted on the frame in rear of the axes of the wheels and extending diagonally forward to position the blades carried by the beams adjacent to the transverse vertical plane of the wheel axes, a tongue pivotally connected with the front portion of the frame, lever mechanism mounted on the frame and operable by the driver from his seat, and means connected with said lever mechanism and with the tongue and actuated by said lever mechanism for applying lateral pressure to the pivotal connection of the tongue to cause the frame to turn horizontally about an axis projected from between the blades.

13. In a machine of the class described, the combination of a rigid frame, a pair of supporting wheels therefor, blade-carrying beams supported from the frame with the blades at the lower ends thereof adjacent to the transverse vertical plane of the wheel axes, a tongue pivotally connected with the front portion of the frame, lever mechanism mounted on the frame and operable by the driver from his seat, and means connected with said lever mechanism and with the tongue and actuated by said lever mechanism for applying lateral pressure to the pivotal connection of the tongue to cause the frame to turn horizontally about an axis projected from between the blades.

14. In an agricultural implement, the combination of a wheel supported frame, earth engaging devices depending from the frame and engaging the ground adjacent to the transverse vertical plane of the wheel axes, a tongue pivotally connected with the front portion of the frame for lateral swinging, lever mechanism mounted on the frame and operable by the driver from his seat, and means connected with and actuated by said lever mechanism for applying lateral pressure to the pivotal connection of the tongue to divert the machine from a direct line of travel.

15. In an agricultural implement, the combination of a wheel supported frame, earth engaging devices depending from the frame and engaging the ground adjacent to the transverse vertical plane of the wheel axes, means for raising and lowering the frame and the earth engaging devices connected therewith, a tongue pivotally connected with the front portion of the frame for lateral swinging, lever mechanism mounted on the frame and operable by the driver from his seat, and means connected with and actuated by said lever mechanism for applying lateral pressure to the pivotal connection of the tongue to divert the machine from a direct line of travel.

16. In an agricultural implement, the combination with a pair of supporting wheels and a rigid frame supported thereby and projecting forward of the transverse vertical plane of the wheel axes, of a tongue pivotally connected with the forward portion of the frame for lateral swinging, lever mechanism mounted on the frame and operable by the driver from his seat, means connected with and actuated by said lever mechanism for applying lateral pressure to deflect the forward portion of said frame laterally, and earth engaging devices carried by said frame and engaging the ground adjacent to said transverse vertical plane.

17. In an agricultural implement, the combination with a pair of supporting wheels and a rigid frame supported thereby and projecting forward of the transverse vertical plane of the wheel axes, of a tongue pivotally connected with the forward portion of the frame for lateral swinging, lever mechanism mounted on the frame and operable by the driver from his seat, means connected with and actuated by said lever mechanism for applying lateral pressure to deflect the forward portion of said frame laterally, and earth engaging devices carried by said frame and engaging the ground adjacent to said transverse vertical plane and adjacent to and at opposite sides of the median line of the implement.

JOHN P. SEAHOLM.